United States Patent
Ulasen et al.

(10) Patent No.: US 12,056,241 B2
(45) Date of Patent: Aug. 6, 2024

(54) INTEGRATED STATIC AND DYNAMIC ANALYSIS FOR MALWARE DETECTION

(71) Applicant: Acronis International GmbH, Schalfhausen (CH)

(72) Inventors: Sergey Ulasen, Singapore (SG); Vladimir Strogov, Singapore (SG); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 215 days.

(21) Appl. No.: 17/646,128

(22) Filed: Dec. 27, 2021

(65) Prior Publication Data
US 2023/0205883 A1    Jun. 29, 2023

(51) Int. Cl.
*G06F 21/56* (2013.01)
*G06F 21/53* (2013.01)
*G06N 20/00* (2019.01)

(52) U.S. Cl.
CPC ............ *G06F 21/566* (2013.01); *G06F 21/53* (2013.01); *G06F 21/565* (2013.01); *G06N 20/00* (2019.01); *G06F 2221/033* (2013.01)

(58) Field of Classification Search
CPC ...... G06F 21/566; G06F 21/53; G06F 21/565; G06F 2221/033; G06F 21/562; G06N 20/00; G06N 20/20
See application file for complete search history.

(56) References Cited

U.S. PATENT DOCUMENTS

| | | | |
|---|---|---|---|
| 8,122,509 B1 | 2/2012 | Belov | |
| 8,401,982 B1 | 3/2013 | Satish et al. | |
| 8,775,333 B1 | 7/2014 | Zahn | |
| 10,637,874 B2* | 4/2020 | Zhao | G06N 3/08 |
| 10,880,328 B2 | 12/2020 | Farhady et al. | |
| 10,997,291 B2* | 5/2021 | Dhankhar | G06F 21/568 |
| 2015/0096022 A1* | 4/2015 | Vincent | G06F 21/562 726/23 |
| 2019/0034632 A1 | 1/2019 | Tsao et al. | |
| 2019/0044964 A1 | 2/2019 | Chari et al. | |
| 2019/0132334 A1* | 5/2019 | Johns | G06F 21/562 |

(Continued)

FOREIGN PATENT DOCUMENTS

| | | |
|---|---|---|
| CN | 111680297 | 9/2020 |
| CN | 109840417 | 12/2020 |

(Continued)

OTHER PUBLICATIONS

Subash Poudyal: "PEFile Analysis: A Static Approach to Ransomware Analysis", Retrieved from the Internet: URL: https://www.researchgate.net/publication/336813424_PEFile_Analysis_A_Static_Approach_To_Ransomware_Analysis.

(Continued)

*Primary Examiner* — Baotran N To
(74) *Attorney, Agent, or Firm* — ESPE Legal Consultancy FZ-LLC

(57) ABSTRACT

A system and method for malware detection uses static and dynamic analysis to train a machine learning model. At the training step, static and dynamic features are extracted from training datasets and used to train a malware classification model. The malware classification model is used to classify unknown files based on verdicts from both static and dynamic models.

11 Claims, 5 Drawing Sheets

(56) References Cited

U.S. PATENT DOCUMENTS

| | | | | |
|---|---|---|---|---|
| 2020/0004956 | A1* | 1/2020 | Romanenko | G06N 20/20 |
| 2020/0026851 | A1* | 1/2020 | Dhankha | G06F 21/554 |
| 2020/0082083 | A1 | 3/2020 | Choi et al. | |
| 2020/0175152 | A1 | 6/2020 | Xu et al. | |
| 2020/0210575 | A1* | 7/2020 | Huang | G06F 21/554 |
| 2022/0237289 | A1* | 7/2022 | Pevny | G06F 21/566 |
| 2023/0205880 | A1* | 6/2023 | Ulasen | G06F 21/53 726/23 |

FOREIGN PATENT DOCUMENTS

| | | |
|---|---|---|
| CN | 109492395 | 1/2021 |
| CN | 110674497 | 7/2021 |
| KR | 20200109677 | 12/2020 |
| KR | 20210089849 | 7/2021 |
| RU | 2739865 | 12/2020 |

OTHER PUBLICATIONS

Joshua Cannell: "Five PE Analysis Tools Worth Looking At", May 28, 2014, Retrieved from the Internet: URL: https://www.malwarebytes.com/blog/news/2014/05/five-pe-analysis-tools-worth-looking-at.

Kaspersky: "Emulator", Retrieved from the Internet: URL: https://www.kaspersky.com/enterprise-security/wiki-section/products/emulator.

Kaspersky: "Sandbox", Retrieved from the Internet: URL: https://www.kaspersky.com/enterprise-security/wiki-section/products/sandbox.

Kaspersky: "System behavior analyzer", Retrieved from the Internet: URL: https://support.kaspersky.com/KESWin/10SP2/en-us/128012.htm.

Jaime Devesa, et. al: "Automatic Behaviour-based Analysis and Classification System for Malware Detection", Retrieved from the Internet: URL: https://www.researchgate.net/publication/220708645_Automatic_Behaviour-based_Analysis_and_Classification_System_for_Malware_Detection.

* cited by examiner

INTEGRATED STATIC AND DYNAMIC ANALYSIS FOR MALWARE DETECTION

FIELD OF THE INVENTION

The invention pertains to the field of computer security, in particular the analysis of untrusted files and processes for malicious behavior.

BACKGROUND OF THE INVENTION

Malicious processes in computer systems can be detected using dynamic analysis and static analysis. Dynamic analysis, also called "behavior analysis" focuses on how an untrusted file or process acts. Static analysis, on the other hand, is concerned with what can be known about an untrusted file or process before runtime.

Static analysis and behavior analysis are perceived as very different approaches to malware detection. This limits the effectiveness of these tools to their own strengths. Behavior analysis, for example, although effective for detecting malware at runtime, lacks the depth of static analysis when used on its own. There is a need for more effective malware analysis tools that augment the usefulness of behavior analysis and static analysis.

SUMMARY OF THE INVENTION

Metadata from static analyzers are used during behavior analysis of an untrusted file or process. For example, static Portable Executable (PE) metadata is combined with behavioral tools such as stack traces and Application Programming Interface (API) calls sequences.

The invention comprises systems and methods for detecting and classifying malware in an unknown file on a target computing system. In an embodiment, a detection and classification method is executed on a processor associated with the target computing system comprising the following steps. First an unknown file is classified with a static analysis machine-learning model based on static features extracted from the file before execution. The verdict of static classification includes a rate of conformity to at least one class of files. Then the file is executed on the target computing system. Alternatively, the target file is executed in a secure environment, such as a sandbox or isolated virtual machine. The secure environment preferably resembles the target computing system so that results in the secure environment are generally predictive of the target computing system.

The method continues with collecting data related to file execution on a target computing system. Dynamic features of a first and second dynamic feature sets are extracted from collected data. The file is classified with a first dynamic analysis machine-learning model based on extracted dynamic features of the first dynamic feature set. The verdict of the first dynamic classification includes a rate of conformity to at least one class of files. The file is also classified using a second dynamic analysis machine-learning model based on extracted dynamic features of the second dynamic feature set. The verdict of the second dynamic classification also includes a rate of conformity to at least one class of files.

The file is then classified with a malware classification machine learning ("ML") model based on the verdict of the static classification, the verdict of the first dynamic classification, and the verdict of the second dynamic classification. The malware classification verdict is processed by an endpoint protection agent to detect malware. A detection response action is performed at the endpoint protection agent to counter the malware.

DETAILED DESCRIPTION

Figure 1:
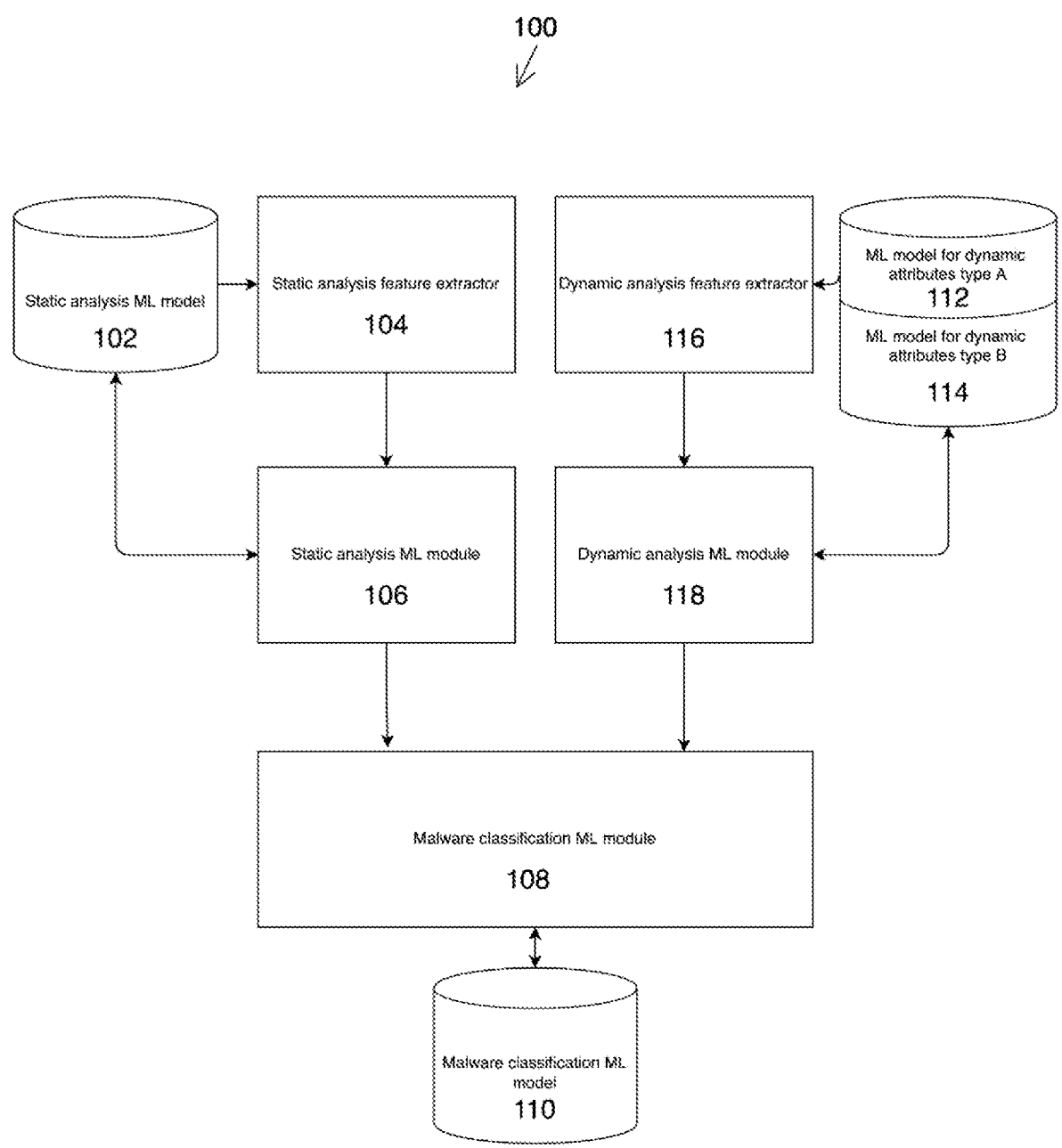
FIG. 1 shows a system configuration for creating a malware classification model in accordance with the invention.

To improve malware detection, a constructed static model is supplemented with the functions of a behavioral analyzer. The static model is built independently of behavioral attributes and creates added helper functions that identify malicious and safe files with the required accuracy.

To further improve detection, the constructed dynamic model is supplemented with the features of the static analyzer model. The dynamic model is built as if nothing is known about the static data and the static analyzer model is built independently from the dynamic analyzer. After being created in the training process, the dynamic model is supplemented with auxiliary attributes of the static analyzer. This approach improves the accuracy of the dynamic analyzer and reduces the number of false positives.

While processing files and processes, the static analyzer and the dynamic analyzer fill a feature table for system objects. These tables are used to build a machine learning model for detecting threats.

Features in this context refer to input variables used in making predictions. Examples of static features include byte n-grams and opcode n-grams. Static features also include strings. String features are based on plain text encoded into executables. Examples of strings found in a Microsoft Windows environment include "windows," "getversion," "getstartupinfo," "getmodulefilename," "message box," "library," and so on. Static features may also be extracted from .exe files. For example, data from a PE header describes the physical and logical structure of a PE binary. Dynamic features are extracted during runtime of an unknown file. Such features are generally function based, such as stack traces, API calls, instruction sets, control flow graphing, function parameter analysis, and system calls.

A machine learning model refers to a file that has been trained to recognize patterns by being passed a training dataset and being provided an algorithm that can be used to analyze and learn from that training dataset. For a supervised learning model, the training dataset includes labels. These labels correspond to the output of the algorithm. A typical model attempts to apply correct labels for the data by applying an algorithm. For example, when the training dataset comprises files to be classified, a predicted label for a given file is calculated. These calculations are then compared to the actual label for that file. The degree of error, the variation between the predicted label and the actual label, is calculated by way of another algorithm, such as a loss function. By repeated attempts (epochs) at classifying the training data, the model will iteratively improve its accuracy. When the accuracy of the model on the training data is optimal, the trained machine learning model can then be used to analyze testing data. Optimization in this context refers to a model that is trained to classify the test data with an acceptable level of accuracy but not overtrained to the point that the model is so sensitive to idiosyncrasies in the training dataset that testing dataset results suffer. Testing data refers to data that has not been seen before.

Modules in this context refer to a file containing a set of functions, arrays, dictionaries, objects, and so on. In the Python language, for example, a module is created by saving program code in a file with the extension .py.

The results of classification by a machine learning model depend on the classification task. For example, in malware detection the task is to determine whether an unknown file is malware or not. To simplify calculations, the strings "malware" and "not malware" are converted to integers. In this context, the label "0" can be assigned to "not malware" and the label "1" can be assigned to "malware." A suitable algorithm for binary classification is then chosen. Some examples of such algorithms include logistic regression, k-nearest neighbors, decision trees, support vector machines, or Bayesian networks. Alternatively, neural networks may be chosen, including neural networks configured for binary classification.

FIG. 1 shows system 100, which combines static and dynamic analysis models to create a malware classification model. Static analysis machine learning ("ML") model 102 is linked with static analysis feature extractor 104 and static analysis ML module 106. Static ML module 106 is configured to pass the results of static analysis to malware classification ML module 108 and the results are stored as malware classification ML model 110. Dynamic ML model for dynamic attributes types A 112 and B 114 is linked with dynamic analysis feature extractor 116 and dynamic analysis ML module 118. Type A and type B dynamic attributes can be divided in several ways. For example, type A dynamic attributes can be stack traces and type B dynamic attributes can be API calls sequences. Alternatively, type A dynamic attributes can be related to operations with files and type B dynamic attributes can be operations with a register or network. Or type A dynamic attributes can be related to file modifications and type B to reading files. Dynamic analysis ML module 118 is configured to pass the results of dynamic analysis to malware classification module 108. This malware classification module 108 is configured to be saved as malware classification machine learning model 110.

Figure 2:
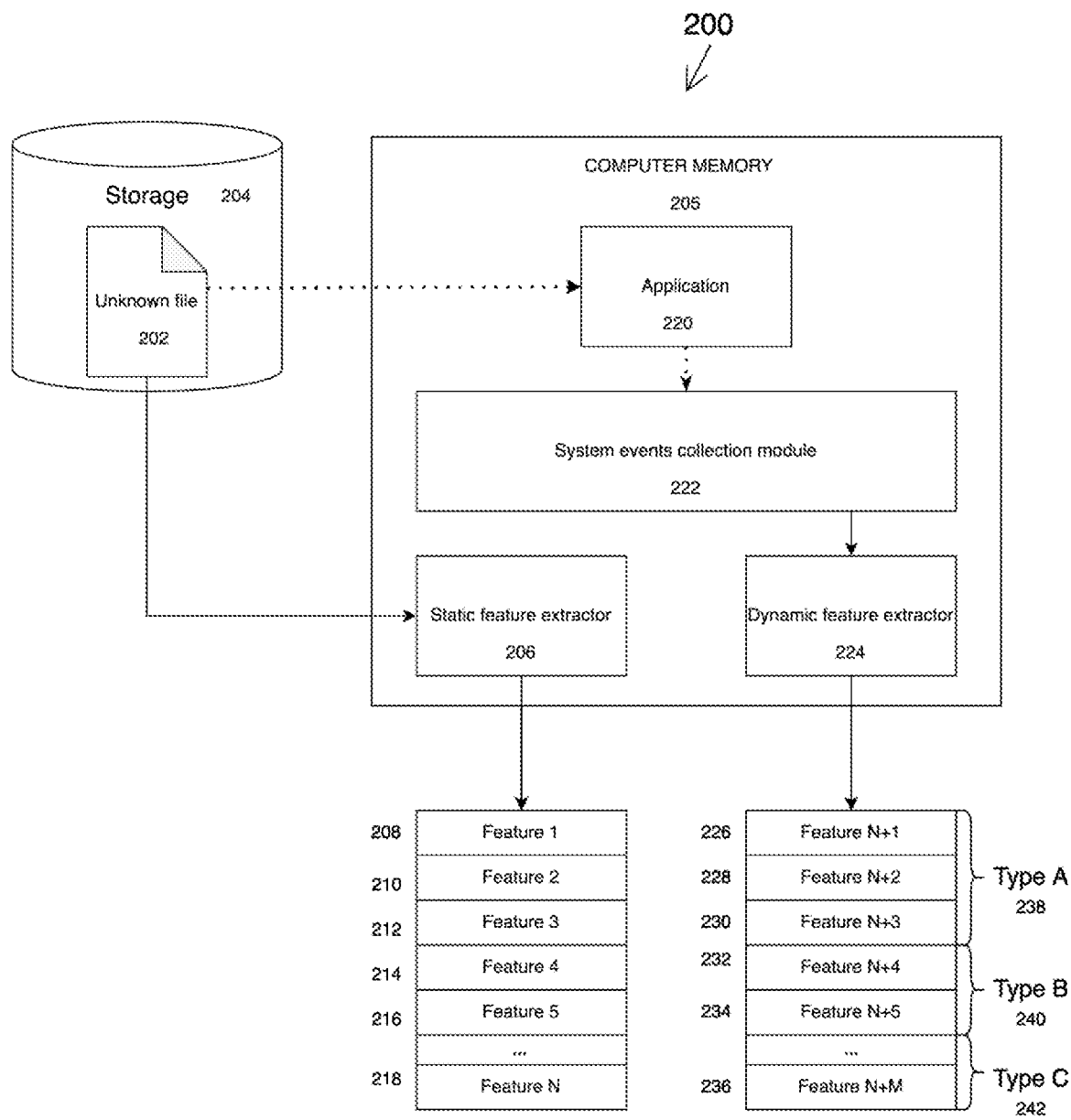
FIG. 2 shows a system configuration for feature extraction comprising dynamic and static analysis.

As shown in FIG. 2, system 200 is directed to analysis of unknown file 202 in storage medium 204. Static feature extractor 206 extracts features 1 to N (208, 210, 212, 214, 216, and 218). Unknown file 202 is also loaded into computer memory 205 and executed by way of application 220. System events from application 220 are recorded by system events collection module 222. Dynamic feature extractor 224 identifies dynamic features N+1, N+2, N+3, . . . N+M (226, 228, 230, 232, 234, 236). These dynamic features are grouped into categories, for example Type A 238, Type B 240, and Type C 242. The dynamic feature categories are of multiple types. For example, two, three, or more types are used. In FIG. 2, three types are shown as examples. These types are chosen from function-based features, such as stack traces, API calls, and system calls.

Figure 3A:
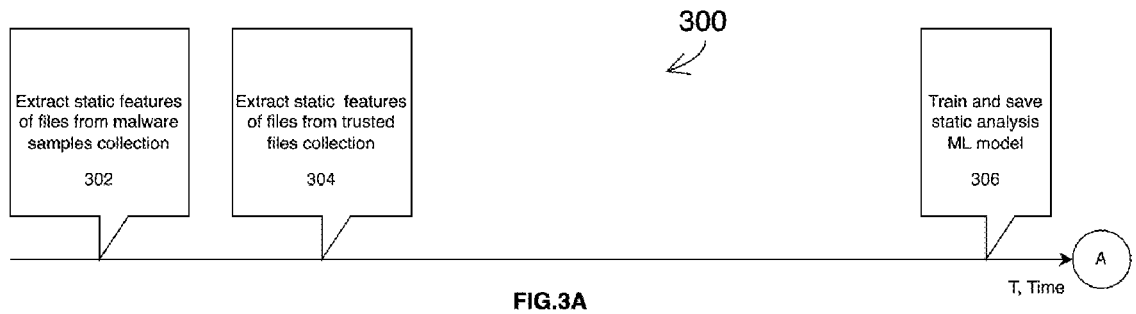
FIGS. 3A, 3B, and 3C show a timeline of steps implementing a method of malware classification in accordance with the invention.
Figure 3B:
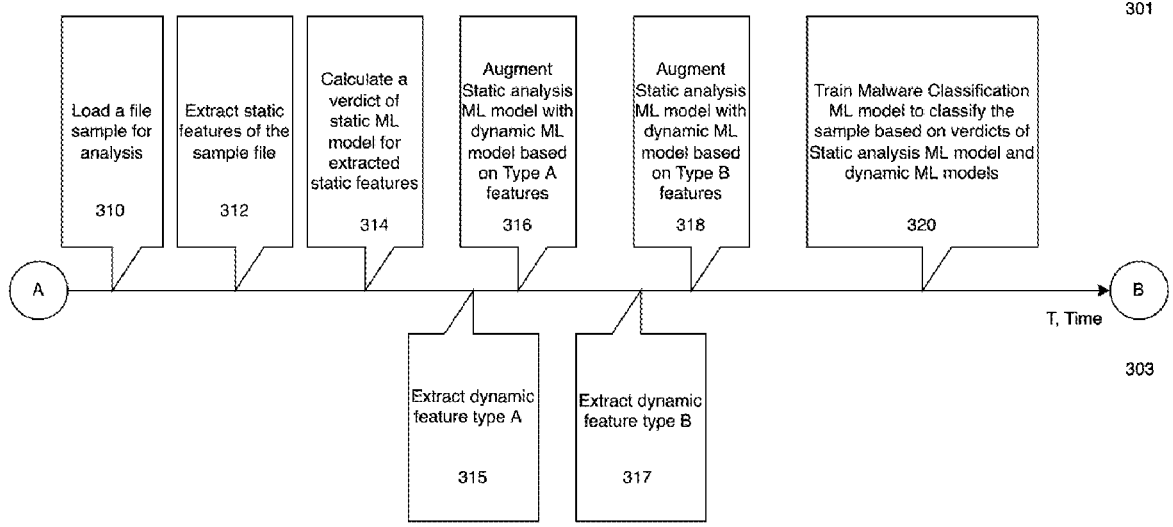
Figure 3C:
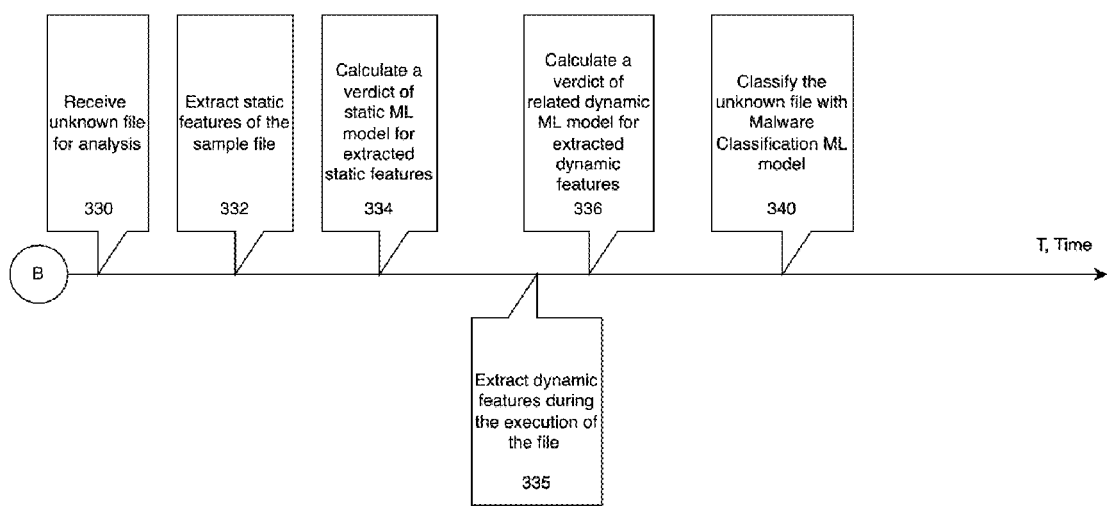

FIGS. 3A, 3B, and 3C show method 300 and its steps performed over some time, T. FIG. 3A shows a first timeline A (301) where static features of files are extracted from a malware sample files collection at step 302. Then static features are extracted from a collection of trusted files as step 304. The features extracted at steps 302 and 304 are used at step 306 to train and save a static analysis machine learning model.

FIG. 3B continues the timeline of FIG. 3A from point A (301) to point B (303). First, a file sample is loaded for analysis at step 310. Then static features from the file sample are extracted at step 312. At step 314, a static machine learning model verdict is calculated for the extracted static features. Next, a first type of dynamic feature (Type A) is extracted from the file sample at step 315. Then the static analysis machine learning model is augmented with a dynamic machine learning model based on Type A features at step 316. A second type of dynamic feature (Type B) is extracted from the same file at step 317. The static analysis machine learning model is further augmented with a dynamic machine learning model based on Type B features at step 318. Based on the verdicts of the static analysis machine learning model and the dynamic machine learning models, a malware classification model is trained to classify the sample at step 320.

FIG. 3C focuses on classification of an unknown file that has been received for analysis at step 330 starting from point B (303) on the timeline. Static features are extracted from the sample file at step 332. Then the static machine learning model's verdict is calculated for the extracted static features at step 334. Dynamic features are then extracted at step 335 while the unknown file is executed. The related dynamic machine learning model calculates a verdict for the extracted dynamic features at step 336. The unknown file is then classified with the malware classification machine learning model at step 340.

Figure 4:
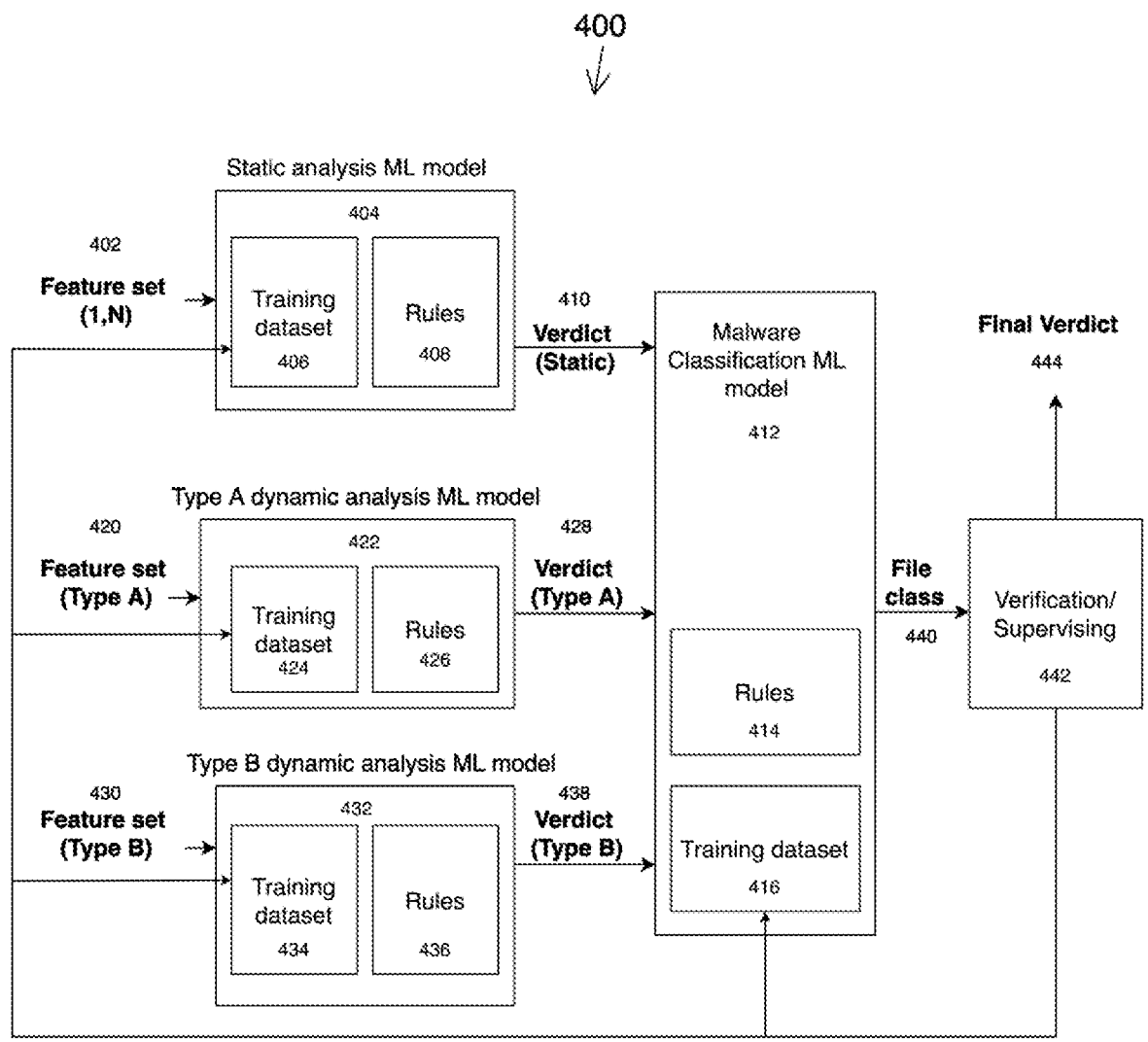
FIG. 4 shows a system configuration for reaching a verdict about an unknown file in accordance with the invention.

FIG. 4 shows system 400 for malware classification. Feature set 402 comprises static features 1-N, which are configured for passing to static analysis machine learning model 404. The static analysis machine learning model 404 comprises training set data 406 and rules 408. For a given file, static analysis machine learning model 404 outputs a verdict 410 based on static features. This verdict 410 is configured to be passed to malware classification model 412 comprising rules 414 and training dataset 416.

Malware classification machine learning model 412 also receives verdicts from dynamic analysis of the given file. Feature set (Type A) 420 comprises features of a first type. These features are configured for passing to a Type A dynamic analysis machine learning model 422. The Type A dynamic analysis machine learning model 422 comprises a training dataset 424 and rules 426. For the same file, machine learning model 422 outputs a verdict 428 based on Type A features. A second feature set (Type B) 430 comprises features of a second type. These features are configured for passing to a Type B dynamic analysis machine learning model 432. The Type B dynamic analysis machine learning model 432 comprises a training dataset 434 and rules 436. For the same file, machine learning model 432 outputs a verdict 438 based on Type B features.

Having received verdicts 410, 428, and 438 with respect to a given file, malware classification model 412 is configured to classify the file and pass this classification 440 to a verification and supervising process 442. This process 442 is configured to output a final verdict 444 with respect to the file. The final verdict 444 for the unknown file is then added as a training data set that can be used to update and correct loss in malware classification model 412.

Figure 5:
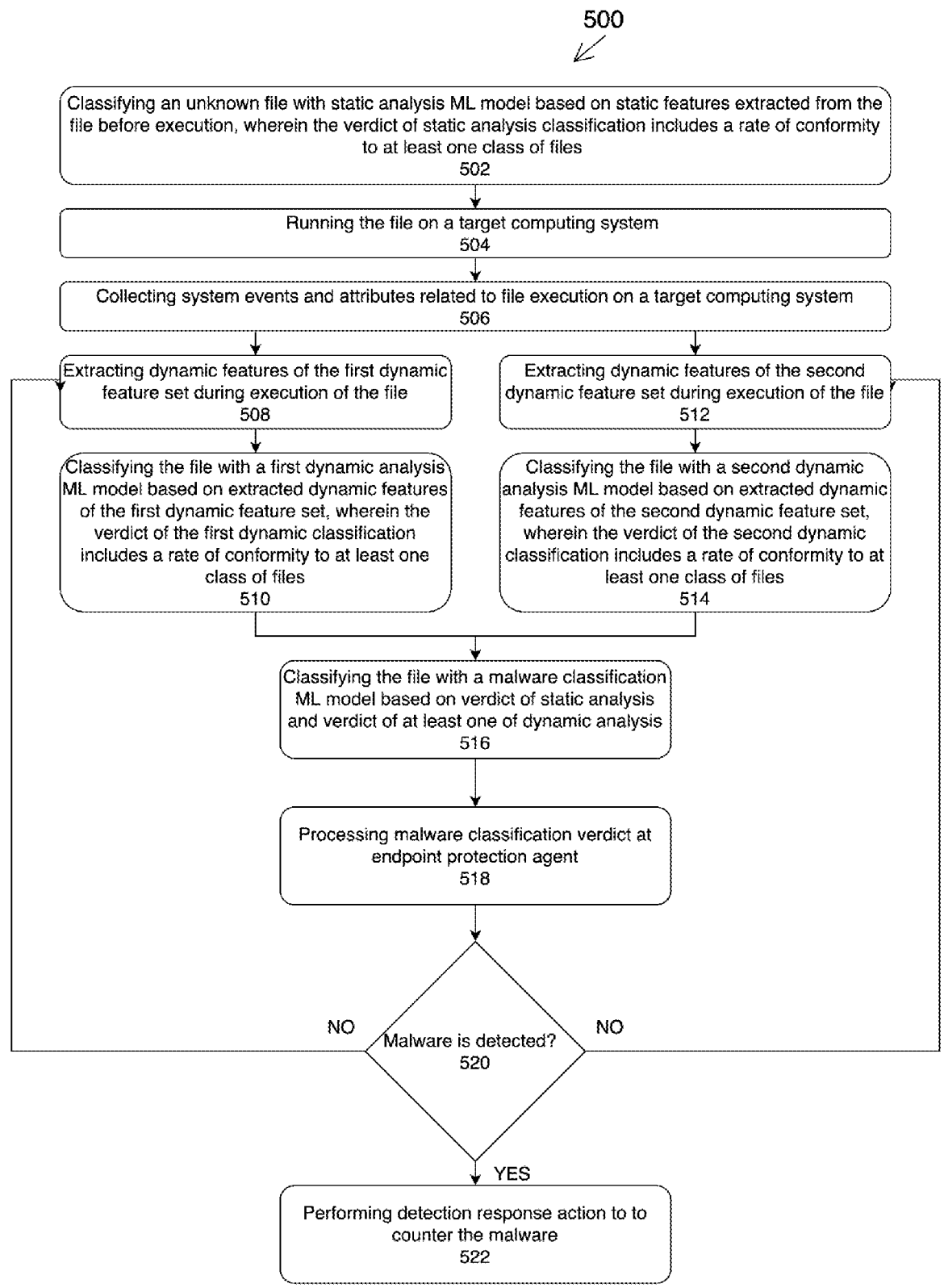
FIG. 5 shows method steps for detecting the presence of malware in an unknown file in accordance with the invention.

FIG. 5 shows method 500, which starts at step 502 with classifying an unknown file with a static analysis machine learning model based on static features extracted from the file before execution. The verdict of static analysis classification includes a rate of conformity to at least one class of files. At step 504 the unknown file is executed (run) on the target computing system. Systems events and attributes related to file execution on a target computing system are collected at step 506. The method continues with extracting dynamic features of a first dynamic feature set during execution of the file at step 508 and classifying the file with a first dynamic analysis machine learning model based on extracted dynamic features of the first dynamic feature set at step 510. The verdict at step 510 includes a rate of conformity to at least one class of files. In parallel with steps 508 and 510, at step 512 dynamic features of a second dynamic feature set are extracted during execution of the file. Then at step 514 the file is classified with a second dynamic analysis machine learning model based on extracted dynamic features of the second dynamic feature set. The verdict at step 514 includes a rate of conformity to at least one class of files.

At step 516, the file is classified with a malware classification machine learning model based on a verdict of static analysis and a verdict of at least one dynamic analysis. The result of step 516 is passed to an endpoint protection agent for processing a malware classification verdict at step 518. A classification is reached at step 520 that determines whether the file is malware or not. If not, the method loops back to step 508 or 512, respectively, and repeats the steps from 508 to 520 or 512 to 520, respectively. If malware is detected at step 520, then a detection response action is performed at step 522 to counter the malware.

The invention claimed is:

1. A computer implemented method for detecting and classifying malware in a file on a target computing system, the method executed on a processor of the target computing system, the method comprising:
   a) Classifying the file with a static analysis machine-learning model based on static features extracted from the file before execution, wherein a verdict of static classification includes a rate of conformity to at least one class of files;
   b) Executing the file on a target computing system;
   c) Collecting data related to file execution on a target computing system;
   d) Extracting dynamic features of a first dynamic feature set from the collected data;
   e) Extracting dynamic features of a second dynamic feature set from the collected data;
   f) Classifying the file with a first dynamic analysis machine-learning model based on the extracted dynamic features of the first dynamic feature set, wherein a verdict of the first dynamic classification includes a rate of conformity to at least one class of files;
   g) Classifying the file with a second dynamic analysis machine-learning model based on extracted dynamic features of the second dynamic feature set, wherein a verdict of the second dynamic classification includes a rate of conformity to at least one class of files; and
   h) Classifying the file with a malware classification machine learning model based on the verdict of the static classification, the verdict of the first dynamic classification and the verdict of the second dynamic classification.

2. The method of claim 1, further comprising the step of processing a malware classification verdict at an endpoint protection agent to detect malware.

3. The method of claim 2, further comprising the step of performing a detection response action at the endpoint protection agent to counter the malware.

4. The method of claim 1, wherein the extracted features of the first dynamic feature set comprises at least one of stack traces, operations with files, or file modifications and wherein the extracted features of the second dynamic feature set comprises at least one of Application Program Interface calls sequences, operations with a register or network, or reading files.

5. A system for detecting and classifying malware in a file on a target computing system comprising:
   a) A processor coupled to a storage device configured for training storing a plurality of machine learning models;
   b) A static analysis machine learning model based on static features extracted from the file before execution, wherein a verdict of static classification includes a rate of conformity to at least one class of files;
   c) A target computing system for executing the file;
   d) Collected data related to file execution on the target computing system;
   e) Extracted dynamic features of a first dynamic feature set from the collected data;
   f) Dynamic features of a second dynamic feature set extracted from the collected data;
   g) A first dynamic analysis machine-learning model based on the extracted dynamic features of the first dynamic feature set, wherein a verdict of the first dynamic classification includes a rate of conformity to at least one class of files; and
   h) A second dynamic analysis machine-learning model based on the extracted dynamic features of the second dynamic feature set, wherein a verdict of the second dynamic classification includes a rate of conformity to at least one class of files; and
   i) A malware classification machine learning model based on the verdict of the static classification, the verdict of the first dynamic classification and the verdict of the second dynamic classification.

6. The system of claim 5, wherein the target computing system further comprises an endpoint agent for performing detection of malicious files based on the verdicts of the static analysis machine learning model and the first and second dynamic analysis machine learning models.

7. The system of claim 6, wherein the endpoint agent evaluates independently the verdicts of the static analysis machine learning model and the first and second dynamic analysis machine learning models.

8. A computer implemented method for detecting and classifying malware in a file on a target computing system, the method executed on a processor of the target computing system, the method comprising:
   a. Classifying the file with a static analysis machine-learning model trained on static features extracted from the file before execution, wherein a verdict of static classification includes a rate of conformity to at least one class of files;
   b. Executing the file on a target computing system;
   c. Collecting data related to file execution on a target computing system;
   d. Extracting dynamic features of a first dynamic feature set from the collected data;
   e. Extracting dynamic features of a second dynamic feature set from the collected data;
   f. Classifying the file with a first dynamic analysis machine-learning model trained independently of the static analysis machine learning model on the extracted dynamic features of the first dynamic feature set, wherein a verdict of the first dynamic classification includes a rate of conformity to at least one class of files;

g. Classifying the file with a second dynamic analysis machine-learning model trained independently of the static analysis machine learning model and the first dynamic analysis machine-learning model, wherein the second dynamic analysis machine learning model is trained on the extracted dynamic features of the second dynamic feature set, and wherein a verdict of the second dynamic classification includes a rate of conformity to at least one class of files; and h. Classifying the file with a malware classification machine learning model based on the verdict of the static classification, the verdict of the first dynamic classification and the verdict of the second dynamic classification.

9. The method of claim 8, further comprising the step of processing a malware classification verdict at an endpoint protection agent to detect malware.

10. The method of claim 9, further comprising the step of performing a detection response action at the endpoint protection agent to counter the malware.

11. The method of claim 8, wherein the extracted features of the first dynamic feature set comprises at least one of stack traces, operations with files, or file modifications and wherein the extracted features of the second dynamic feature set comprises at least one of Application Program Interface calls sequences, operations with a register or network, or reading files.

* * * * *